United States Patent Office 2,833,784
Patented May 6, 1958

2,833,784

PRODUCTION OF CHLORINATED PHTHALOCYANINES

Felix Frederick Ehrich, Westfield, N. J., assignor to E. I. du Pont de Nemours and Company, Wilmington, Del.

No Drawing. Application April 12, 1954
Serial No. 422,674

10 Claims. (Cl. 260—314.5)

This invention relates to phthalocyanine pigments and to improved processes for their manufacture. More particularly, it relates to the preparation of polychloro phthalocyanine pigments, especially polychloro copper phthalocyanine, and to novel improvements in the manufacture of such pigments to obtain products peculiarly useful in a simplified finishing process.

Polychloro phthalocyanine pigments, and polychloro copper phthalocyanine in particular, have been prepared by direct chlorination of a phthalocyanine pigment, especially copper phthalocyanine. In one such procedure (U. S. 2,247,752), the chlorination is carried out in a molten bath of a metal halide, preferably the eutectic mixture of aluminum chloride and sodium chloride. In another (U. S. 2,377,685), copper phthalocyanine is chlorinated with sulfur dichloride under pressure in the presence of small, catalytic amounts (5–10%) of chlorination catalysts such as $FeCl_3$, $SbCl_3$, or $AlCl_3$. Other processes also exist, such as chlorination in molten phthalic anhydride (U. S. 2,195,984), chlorination under pressure in the presence of liquid diluents such as trichlorobenzene (British 499,415), and direct chlorination at high temperatures in a fluid bed of copper phthalocyanine and sodium chloride (U. S. 2,586,598).

These prior processes yield products which, even when pulverized to superficially fine powders, exhibit very poor pigment properties, being dull greens of low tinctorial strength. Consequently, elaborate finishing methods have been required to purify them and to reduce their particle size to that required in pigments of desired high tinctorial strength. Such finishing methods include solution in sulfuric acid or chlorsulfonic acid followed by precipitation by means of drowning in water, prolonged milling with an inorganic salt such as sodium chloride (U. S. 2,402,197), and grinding in a ball mill in suspension in an organic diluent such as acetone (U. S. 2,556,727). Certain disadvantages accompany these finishing methods, including such serious problems as corrosion and costly maintenance of equipment, disposal of waste acid, dusting, recovery of expensive organic liquids, and hazards in the use of inflammable liquids.

Extensive research directed toward improved and simplified methods of pigment finishing has been undertaken. Thus, in the copending applications of Stryker, Williamson and Gross, Serial No. 350,502, filed April 22, 1953, and Serial No. 422,492, filed concurrently herewith, highly useful methods are disclosed whereby the product obtained from the eutectic chlorination may be prepared in pigmentary form directly from the aqueous slurry obtained by drowning the reaction mass in water, or from the aqueous paste obtained by removing most of the water-soluble salts by filtration. As therein contemplated, the aqueous slurry or paste can be treated with an organic diluent, such as ortho-dichlorobenzene, followed by removal of the diluent and a subsequent isolation of the pigment effected by conventional means. However, the improved finishing methods of these applications are not usefully adaptable to the treatment of polychloro copper phthalocyanines prepared by other methods of chlorination and particularly to pigments prepared by the sulfur chloride method of U. S. 2,377,685.

It is among the objects of this invention to overcome the above and other disadvantages of prior phthalocyanine pigment production, and to provide novel and effective methods for attaining such objects. It is among the particular objects of this invention to advantageously modify the sulfur chloride chlorination process of U. S. 2,377,685 for the preparation of improved polychloro phthalocyanine pigments whereby products made by such process become readily responsive and amenable to the finishing procedures of said U. S. applications Serial No. 350,502 and Serial No. 422,492. It is a further object of the invention to provide improvements on the process of said application when applied to products chlorinated and treated as described herein. Other objects and advantages of the invention will be apparent from the ensuing description of the invention.

These and other objects are accomplished in this invention which comprises producing a highly chlorinated phthalocyanine compound by subjecting a phthalocyanine compound to reaction within a closed vessel with a chlorinating agent containing sulfur dichloride as an essential ingredient and in the presence of at least two mols of a metal halide, such as anhydrous aluminum chloride, thereafter removing the sulfur chloride from the reaction mass and subjecting the chlorinated phthalocyanine product to pigment finishing treatment.

In a more specific and preferred embodiment, the invention comprises chlorinating copper phthalocyanine with sulfur dichloride in accordance with the procedures disclosed in U. S. Patent 2,377,685 and in the presence of an amount of anhydrous aluminum chloride substantially equal to the weight of the copper phthalocyanine used, thereafter removing the sulfur chloride, as by distillation, from the resulting reaction, and subjecting the dry product to a pigment finishing treatment, such as with water and a selected organic solvent, in accordance with the procedures disclosed in said U. S. applications Serial No. 350,502 and Serial No. 422,492.

In description of one preferred embodiment of the invention, copper phthalocyanine is chlorinated using sulfur dichloride as both the source of chlorine and as the diluent in substantially the manner described in U. S. 2,377,685, except that instead of using, at most, 10% of aluminum chloride, based on the copper phthalocyanine, as a catalyst, an amount of aluminum chloride substantially equal to the weight of the copper phthalocyanine is used. This, the phthalocyanine is heated in a closed vessel and at a temperature above 100° C. to 175° C. and at about 150° C., with from 13 to 15 times its own weight of a liquid chlorinating agent consisting predominantly of sulfur dichloride and in the presence of from 4–5 mols of $AlCl_3$ per mol of copper phthalocyanine. The sulfur chloride and liquid diluents and by-products are then removed, as by distillation, to give a dry product contaminated with aluminum chloride and other water-insoluble impurities. This dry powder can be dispersed in water and the pigment filtered to effect removal of most of the dissolved aluminum chloride and other water-soluble impurities. The wet press cake is then redispersed in a strong aqueous alkaline (preferably above pH 10) solution and treated with an amount of ortho-dichlorobenzene substantially equal to the weight of the dry pigment and with a small amount of an agent such as stearic acid. The mixture is then subjected to steam distillation to remove the ortho dichlorobenzene, and the pigment is isolated and dried and recovered in a conventional manner.

Alternatively, the ortho-dichloro benzene can be introduced into the aqueous slurry at the time of the first extraction of the chlorination mass. After filtration to remove the water-soluble salts, the pigment paste containing both water and organic liquid is introduced together with more organic liquid, if desired, into the alkaline solution with stearic acid and then steam distilled.

To a clearer understanding of the invention, the following illustrative examples are given. The parts and percentages given apply on a weight basis unless otherwise specified.

Example I

Into a Monel metal autoclave equipped with an efficient agitator and capable of withstanding pressures in the order of 40–50 atmospheres, there was charged 327 parts of copper phthalocyanine (prepared by any of several well-known methods, especially that of U. S. 2,197,458 and 2,214,477) together with 33 parts anhydrous cupric chloride, 327 parts of anhydrous aluminum chloride and about 4900 parts of sulfur dichloride containing 68–69% chlorine. After closing the autoclave, it was very slowly heated, as in an oil bath, to a final temperature of about 180° C. During this heating cycle the pressure increased because of the vapor pressure of the sulfur dichloride and because of the HCl released as the chlorination of the phthalocyanine molecule proceeded. When the pressure reached 265 pounds per square inch it was then vented and kept at 265 p. s. i. throughout the cycle which extended for about 4 hours after the temperature reached 180° C. with the temperature maintained at 180–185° C.

At the end of the 4-hour heating cycle, the pressure in the autoclave was reduced to atmospheric pressure by venting through a recovery system for the sulfur chloride and heating was continued while a stream of chlorine gas was passed through to assist in the removal and recovery of the sulfur dichloride. There finally resulted a dry product which required further treatment before use as a pigment.

182 parts of the crude pigment thus obtained (about 122 parts of pigment remaining after extraction with water) was slurried in about 2000 parts of water with good agitation until a smooth slurry resulted. This slurry was heated to the boil, stirred for a short time at the boil, then filtered and washed free of soluble salts. The filter cake was then added to a solution of about 10 parts of caustic soda (NaOH) in 2000 parts of water, and stirred for a short period to give a uniform dispersion of the pigment in the water. 122 parts of ortho-dichlorobenzene was then added, followed by 4 parts of stearic acid, and the mixture was stirred vigorously and subjected to steam distillation until all of the orthodichlorobenzene was removed. The slurry was finally filtered, washed alkali-free and dried to give a bright green pigment of a relatively yellow hue. This green pigment required no particle size reduction. Furthermore, it had excellent texture and exhibited remarkable ease of dispersion in the usual coating composition vehicles.

Example II

In a modification of the process described in Example I, 327 parts of anhydrous ferric chloride ($FeCl_3$) was used in place of the $AlCl_3$. In operating details, the processes were otherwise alike and the resulting products were subjected to the same further treatment before use as pigments.

Example III 182 parts of the crude pigment as prepared in Example I (about 122 parts of water-extracted solids) was slurried in about 2000 parts of water with good agitation and the stirring was continued for about 15 minutes until a smooth slurry resulted. Then, 79 parts of orthodichlorobenzene was added dropwise while continuing the vigorous agitation to give granular pigment particles which were filtered from the water and washed until free of chlorides. The granular cake was then charged to a steam still containing 2000 parts of water in which 50 parts of disodium phosphate ($Na_2HPO_4.12H_2O$) was dissolved. 2.4 parts of sperm oil was added and the orthodichlorobenzene removed by steam distillation. The resulting alkaline slurry was filtered hot, washed free of alkali, dried at 60° C., and pulverized to give a high strength polychloro copper phthalocyanine which required no particle size reduction for use as a green pigment. Furthermore, this pigment was markedly more yellow in hue than a portion of the same crude pigment which had been extracted in the heretofore known manner and conditioned for pigment use either by acid pasting or by the milling methods of U. S. 2,556,727 or U. S. 2,556,728 and 2,556,730.

Example IV 182 parts of the crude pigment as prepared in Example I was slurried with water, treated with 79 parts of orthodichlorobenzene, filtered and washed as in Example III above. The granular cake was then charged to a steam still containing 2000 parts of water and, while vigorously stirring, 25 parts of orthodichlorobenzene was added to increase the total amount to 85% of the pigment charge. 50 parts of disodium phosphate ($Na_2HPO_4.12H_2O$) and 2.4 parts of sperm oil were then added, the orthodichlorobenzene removed by steam distillation and the aqueous slurry filtered, washed and dried as in Example III above. The resulting product after pulverization was a bright green pigment which exhibited somewhat better color strength and a somewhat yellower hue than the pigment of Example III. Both of these products exhibit relatively jet masstones in printing ink and a highly desirable two-tone effect when combined with flake aluminum in the pigmentation of automotive lacquers or enamels.

Example V

Example IV was duplicated, except that the amount of orthodichlorobenzene added to the steam still prior to distillation was increased to 1140 parts to give a two-phase liquid system containing a total of 10 parts orthodichlorobenzene in which 1 part of pigment was suspended.

After removal of the orthodichlorobenzene by steam distillation and isolation of the pigment as described in Example III above, there was obtained a green pigment which had increased strength and yellowness over that of Example IV.

To obtain a still stronger and yellower product, the slurry containing the 10 parts of orthodichlorobenzene was heated at 130–150° C. until all of the water was removed. The charge was then cooled below 100° C., a small amount of water introduced, the alkali and treating agents added, and the subsequent steps of steam distillation and isolation carried out as above.

The progressive increase of strength and yellowness of Examples IV and V is obtained only at the sacrifice of certain other properties, notably jetness of masstone, as well as at a distinct increase in cost. Hence, a compromise in properties must needs be sought and these examples illustrate a range of existing possibilities.

Example VI 200 parts copper phthalocyanine was chlorinated to a chlorine content of about 46% by heating under pressure with sulfur dichloride in the presence of antimony chloride, as the catalyst, in accordance with the disclosure of U. S. 2,377,65. When chlorination was complete, the charge was vented to atmospheric pressure and cooled to about 100° C. Then, 200 parts of anhydrous aluminum chloride was added to the charge and the sulfur chloride removed by distilling in the presence of a stream of chlorine gas. The dry powder was then slurried in about 6000 parts of water and 240 parts of orthodichlorobenzene was added over a period of about 30 minutes while stirring vigorously. The granular slurry was filtered and washed free of chlorides. The granular cake is then introduced into a steam still containing about 8000 parts of water in which was dissolved about 150 parts of trisodium phosphate ($Na_3PO_4.12H_2O$) and 8 parts sperm oil was added. The orthodichlorobenzene was removed by steam distillation and the resulting alkaline slurry was filtered hot, washed free of alkali, dried at 60° C., and pulverized to give a polychloro copper phthalocyanine pigment which required no particle size reduction for use as a green pigment.

Example VII

Chlorination of copper phthalocyanine was carried out as in Example I except that the 327 parts of anhydrous aluminum chloride was replaced by 515 parts of cryolite ($Na_3AlF_6$). After distillation of the sulfur chloride, 182 parts of the dry powder resulting (equivalent to about 100 parts of pigment after removal of the water-soluble impurities) was dispersed in 2000 parts of water containing 100 parts of sodium hydroxide. When the color was thoroughly wet, 75 parts of orthodichlorobenzene was added and the slurry was agitated for a short time. The resulting granular pigment was filtered and washed free of water-soluble salts until substantially neutral in reaction. The press cake was reslurried in 6000 parts of water and there was then added 2 parts sperm oil, 10 parts trisodium phosphate ($Na_3PO_4.12H_2O$) and 100 parts sodium hydroxide. After vigorous agitation, 15 parts orthodichlorobenzene was added and the mixture subjected to steam distillation until free of organic liquid. After isolation in the usual manner, a green pigment was obtained which exhibited good pigmentary strength and remarkably soft texture and ease of dispersion in vehicles.

While aluminum chloride and ferric chloride are preferred for use in the process, other operatively useful metal halides, including aluminum bromide, ferric bromide, cryolite ($Na_3AlF_6$), or mixtures of such salts can be used.

The amount of aluminum chloride (or other effective salt) used herein must be at least 2 mols per mol of phthalocyanine pigment present. This is approximately 50% the weight of the equivalent copper phthalocyanine and contrasts sharply with the small catalytic amounts previously proposed for use. It is only at about such 50% level that truly pigmentary products can be obtained. Even these products are not generally desired because they exhibit a bluish hue and it is only when the amount of $AlCl_3$ is approximately equivalent in weight to the copper phthalocyanine that the desired yellow hue is obtained. Larger amounts may be used, but since they offer no advantage in properties and therefore are not economically attractive such larger amounts are not recommended.

If desired, the chlorination can be carried out essentially as described in said U. S. Patent 2,377,685 but just prior to the removal of sulfur chloride an amount of anhydrous aluminum chloride equivalent to that used in the preferred process above can be added to the chlorination mass, followed by removal of the sulfur chloride, extraction and treatment as above described. That is, introduction is contemplated in accordance with the invention of at least 2 mols of aluminum chloride per mol of pigment into a sulfur chloride process for the chlorination of copper phthalocyanine prior to the removal of the sulfur chloride from the reaction mass.

As above noted, the invention is particularly concerned with an improved process for the manufacture of halogenated metal phthlocyanines and particularly polychloro copper phthalocyanine in which from about 13.5 to about 15.5 atoms of chlorine (on the average) per molecule are present in the final product. While copper phthalocyanines are readily chlorinated in accordance with the invention, other members of the phthalocyanine series, including metal and metal-free phthalocyanines generally can be similarly chlorinated. For example, in lieu of copper phthalocyanine, a partially chlorinated copper phthalocyanine such as copper monochloro phthalocyanine or a tetrachloro or octachloro compound can be used.

As contemplated in U. S. 2,377,685, the sulfur dichloride reactant can be used in the joint capacity of halogenating agent and diluent. The reaction is carried out in a closed vessel, preferably one provided with bleeding-off valves to control the maximum pressure within the vessel. The pressure employed can range from about 100–600 pounds per square inch, and preferably ranges from about 200–300 pounds per square inch. The sulfur dichloride used can be readily prepared by passing chlorine into sulfur monochloride at atmospheric pressure and until the chlorine is no longer readily absorbed, as disclosed in said patent.

A large number of organic diluents besides orthodichlorobenzene shown in the examples, can be effectively employed. Ortho-dichlorobenzene is preferred for use because it exhibits a most desirable combination of physical properties and low cost. The following comprise illustrative examples of other useful diluents:

Trichlorobenzene
Nitrobenzene
Tetrachloroethylene
Benzene
Xylene
Trichloroethylene The amount of organic diluent used can vary widely. As shown in the examples, it can range from about 65% of the weight of the dry pigment to about 10 times its weight. Below about 65% there is a sharp reduction in the tinctorial strength resulting so that this may be considered a practical lower limit. In processes such as Example III, wherein the aqueous slurry containing the diluent is filtered, any amount substantially above 65% reults in a sticky press cake which is very hard to handle. However, the addition of more diluent just prior to steam distillation is shown in Examples IV and V as an important variable which may influence the properties of the pigment. Similarly, the amount of diluent may be varied in Example I with some influence on properties, and the preferred amount will be selected on the basis of the properties desired. For most uses, the optimum combination of properties is obtained when the diluent present at the beginning of steam distillation is between about 80% and 100% the weight of the dry pigment present.

One of the major problems in the manufacture of phthalocyanine pigments is to obtain soft products which are easy to disperse in the ultimate compositions of use such as in paints, printing inks, plastics, rubber, and the like. With certain variations in the process, a profound influence on this property can result. In particular, the introduction of a long chain acid or related derivative during the steam distillation step will promote the desired improvement in texture. Agents of this type can be advantageously used wherever a dry pigment is the end product. Stearic acid and sperm oil have been shown in the examples. Other agents, such as the following, are illustrative of those which are also useful:

Oleic acid
Rosin
Naphthenic acids
Glycol distearate
Linseed oil fatty acids
Sodium petroleum sulfonate
Octanol In addition to such agent use, the treatment of the aqueous slurry with alkali prior to and during the steam distillation promotes good texture and ease of dispersion. The product of Example I is outstanding in this respect.

It will be noted that in such example a thorough dispersion of the pigment in an aqueous solution of alkali is obtained before the organic diluent is added, whereas in Examples III, IV, V and VI the pigment is treated with the diluent liquid under neutral or acid conditions. Although the resulting products are valuable in each case, a pronounced advantage, particularly in the texture, obtains when the pigment is dispersed in alkali before treatment with the diluent and such is a preferred procedure in accordance with the invention.

Although not intended to restrict the scope of this invention, it is believed that the intimate association of polychloro copper phthalocyanine and molecular rather than catalytic amounts of aluminum chloride in the presence of sulfur chloride results in the formation of a pigment-metal halide complex, from which the pigment is regenerated in very small particle size upon contact with water. Apparently, however, some metal halide is tenaciously retained by these crystals, perhaps still combined chemically therewith, and such products tend to agglomerate and show no strength advantage over other prior art products when finished by the well-known prior art processes. Now it has been found that, when these crystals in water-wet form are also treated with the selected organic diluent, such as ortho-dichlorobenzene, a further amount of metal halide is released from the pigment and may then be removed by washing. It appears that this release of metal halide and possibly replacement by the liquid diluent results in a marked reduction in the tendency to agglomerate, so that the crystals as formed by the first dispersion in water are retained in the final product. They are already of pigmentary size, so that no additional elaborate procedure for particle size reduction is necessary.

As above noted, the invention involves a highly useful modification of the sulfur chloride chlorination process described in U. S. Patent 2,377,685, wherein the crude polychloro copper phthalocyanine is treated prior to removal of the sulfur chloride with a molecular rather than a catalytic amount of the contemplated metal halides, followed by removal of the sulfur chloride from the reaction mass and treatment with both water and an organic diluent. Such metal halide treatment can take place either during the chlorination or immediately after the chlorination but while the sulfur chloride is still present. The invention affords several significant advantages over prior art procedures. Thus, products obtained in accordance with the preferred procedure offer very definite advantages to the trade over prior art products, particularly in respect to their distinctly yellower hue. In addition, a substantially simplified process is provided which permits significant economies in operation by eliminating the need for either acid pasting or any expensive grinding process to convert the final product to commercially useful state. Also, the process renders the methods described in applications Ser. No. 350,502 and Ser. No. 422,492 applicable for use with the sulfur chloride process of chlorination to obtain commercially useful polychloro phthalocyanine pigments.

I claim as my invention:

1. In a process for producing a chlorinated phthalocyanine wherein a phthalocyanine compound is chlorinated in a closed reaction zone with a chlorinating agent consisting predominantly of sulfur dichloride, the improvement which comprises prior to removal of sulfur chloride from the reaction mass introducing into the process at least 2 mols per mol of phthalocyanine of a metal halide selected from the group consisting of aluminum chloride, aluminum bromide, ferric chloride, ferric bromide, and sodium aluminum fluoride.

2. In a process for producing polychloro copper phthalocyanine wherein copper phthalocyanine is chlorinated in a closed reaction zone with a chlorinating agent consisting predominantly of sulfur dichloride, the improvement which comprises prior to removal of sulfur chloride from the reaction mass contacting said mass with at least 2 mols per mol of copper phthalocyanine of a metal halide selected from the group consisting of aluminum chloride, aluminum bromide, ferric chloride, ferric bromide, and sodium aluminum fluoride.

3. A method for producing a highly chlorinated phthalocyanine compound which comprises reacting a phthalocyanine compound within a closed vessel with a chlorinating agent consisting predominantly of sulfur dichloride and in the presence of at least 2 mols per mol of said phthalocyanine compound of a metal halide selected from the group consisting of aluminum chloride, aluminum bromide, ferric chloride, ferric bromide, and sodium aluminum fluoride, and thereafter removing sulfur chloride from the reaction mass and recovering the resultant chlorinated product.

4. A method for chlorinating copper phthalocyanine which comprises reacting copper phthalocyanine within a closed vessel with sulfur dichloride and in the presence of at least 2 mols per mol of said phthalocyanine compound of a metal halide selected from the group consisting of aluminum chloride, aluminum bromide, ferric chloride, and sodium aluminum fluoride, and thereafter removing sulfur chloride from the reaction mass and recovering the resultant chlorinated product.

5. A method for chlorinating copper phthalocyanine which comprises reacting said phthalocyanine within a closed vessel with sulfur dichloride, in the presence of from 4–5 mols of anhydrous aluminum chloride per mol of copper phthalocyanine used, thereafter removing sulfur chloride from the reaction product and recovering the chlorinated copper phthalocyanine product.

6. A method for chlorinating copper phthalocyanine which comprises reacting said phthalocyanine within a closed vessel with sulfur dichloride, in the presence of from 4–5 mols of ferric chloride per mol of copper phthalocyanine used, thereafter removing sulfur chloride from the reaction product and recovering the chlorinated copper phthalocyanine product.

7. A method for chlorinating copper phthalocyanine which comprises reacting said phthalocyanine within a closed vessel with sulfur dichloride, in the presence of from 4–5 mols of cryolite per mol of copper phthalocyanine used, thereafter removing sulfur chloride from the reaction product and recovering the chlorinated copper phthalocyanine product.

8. A process for producing chlorinated copper phthalocyanine comprising heating copper phthalocyanine in a closed reaction vessel at a temperature above 100° C. with from 13–15 times its own weight of a liquid chlorinating agent consisting predominantly of sulfur dichloride, in the presence of at least 2 mols per mol of copper phthalocyanine of a metal halide selected from the group consisting of aluminum chloride, aluminum bromide, ferric chloride, ferric bromide, and sodium aluminum fluoride, removing sulfur chloride from the resulting reaction mass and recovering the resulting chlorinated copper phthalocyanine product.

9. A process for producing chlorinated copper phthalocyanine comprising heating copper phthalocyanine to an elevated temperature in a closed reaction vessel with an excess of a liquid chlorinating agent consisting predominantly of sulfur dichloride, incorporating into the reaction mixture of the phthalocyanine and the sulfur dichloride at least 2 mols per mol of copper phthalocyanine of a metal halide selected from the group consisting of aluminum chloride, aluminum bromide, ferric chloride, ferric bromide, and sodium aluminum fluoride, and thereafter separating the resulting chlorinated copper phthalocyanine from excess liquids present and recovering the chlorinated copper phthalocyanine product in dry state.

10. A process for producing polychloro copper phthalocyanine which comprises reacting copper phthalocyanine within a closed vessel with a chlorinating agent consisting predominantly of sulfur dichloride, prior to removal of sulfur chloride from the resulting reaction product incorporating into said product at least 2 mols per mol of copper phthalocyanine of a metal halide selected from the group consisting of aluminum chloride, aluminum bromide, ferric chloride, ferric bromide, and sodium aluminum fluoride, separating the resulting chlorinated copper phthalocyanine from the resulting reaction mass, dispersing the separated chlorinated phthalocyanine in water, filtering to remove dissolved metal halide treating agent, redispersing the product in a strong aqueous alkaline solution, and treating the dispersion with an organic diluent in amount ranging from about 65% of the weight of the dry polychloro copper phthalocyanine to about 10 times its weight, and thereafter subjecting the treated product to steam distillation in the presence of a long-chain acid pigment texture improving agent.

References Cited in the file of this patent

UNITED STATES PATENTS

| | | |
|---|---|---|
| 2,253,560 | Detrick et al. | Aug. 26, 1941 |
| 2,276,860 | Niemann et al. | Mar. 17, 1942 |
| 2,377,685 | Fox et al. | June 5, 1945 |
| 2,615,026 | Lytle | Oct. 21, 1952 |
| 2,618,642 | Keller et al. | Nov. 18, 1952 |
| 2,662,085 | Holtzman et al. | Dec. 8, 1953 |